H. M. PRATT.
CORN BUTTERER.
APPLICATION FILED JAN. 23, 1914.
1,097,465.
Patented May 19, 1914.
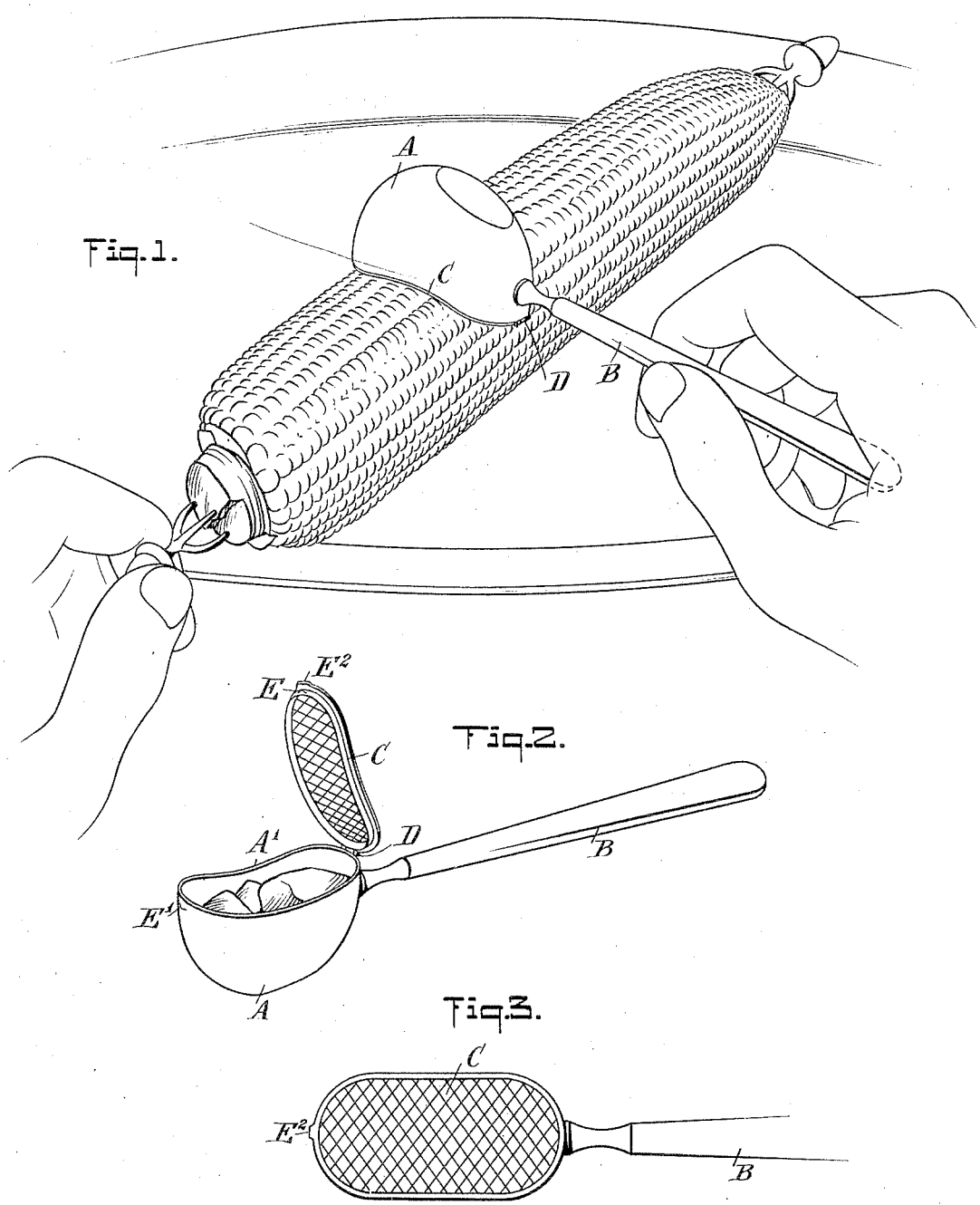
WITNESSES
INVENTOR
Herbert M. Pratt
BY
ATTORNEYS

UNITED STATES PATENT OFFICE.

HERBERT M. PRATT, OF JERSEY CITY, NEW JERSEY.

CORN-BUTTERER.

1,097,465.  Specification of Letters Patent.  Patented May 19, 1914.

Application filed January 23, 1914. Serial No. 813,395.

*To all whom it may concern:*

Be it known that I, HERBERT M. PRATT, a citizen of the United States, and a resident of Jersey City, in the county of Hudson and State of New Jersey, have invented a new and Improved Corn - Butterer, of which the following is a full, clear, and exact description.

The invention relates to table ware and its object is to provide a new and improved corn butterer, more especially designed for conveniently and evenly spreading butter onto an ear of corn prior to eating the same.

In order to accomplish the desired result use is made of a handled bowl adapted to contain butter and having an approximately concave perforate cover adapted to fit onto the peripheral face of an ear of corn.

A practical embodiment of the invention is represented in the accompanying drawings forming a part of this specification, in which similar characters of reference indicate corresponding parts in all the views.

Figure 1 is a perspective view of the corn butterer as applied; Fig. 2 is a perspective view of the corn butterer with the cover in open position and with lumps of butter in the bowl; Fig. 3 is a plan view of the corn butterer with the cover in closed position; and Fig. 4 is an enlarged sectional side elevation of the fastening device for holding the cover in closed position on the bowl.

The bowl A of the corn butterer is preferably somewhat elongated and is provided at one end with a handle B adapted to be taken hold of by the user for manipulating the corn butterer, as hereinafter more fully explained. The rim A' of the bowl A is made concave and onto it fits a correspondingly-shaped perforate cover C connected by a hinge D with the rim A' adjacent the handle B, as plainly indicated in Fig. 2. The free end of the cover C is provided with a fastening member E adapted to engage a fastening member E' formed at the forward end of the bowl A so that when the cover C is closed and pressed downward then the fastening members E and E' engage one the other to hold the cover C in closed position. The free end of the cover C is also provided with a flange E² adapted to be taken hold of by the user to permit of conveniently swinging the cover C into open position.

In using the corn butterer, the cover C is swung into open position, as shown in Fig. 2, and then the butter is placed into the bowl A, after which the cover C is swung downward and locked in closed position by forcing the cover C with sufficient force downward to engage the fastening members E and E' with each other. The user having hold of the handle B now turns the butterer around so that the cover C is downward, as indicated in Fig. 1, and while the butterer is in this position the cover C is placed in contact with the peripheral face of the hot ear of corn so that the cover C and the bowl A are heated sufficiently to melt the butter contained in the bowl A, and by the operator now moving the bowl A and its closed cover lengthwise over the peripheral face of the ear of corn, the butter readily flows through the open meshes of the perforate cover onto the corn. By making the cover C concave it snugly fits onto the peripheral face of the ear of corn and hence a large area is covered with butter without danger of spilling any of the butter, it being understood that during the lengthwise movement given to the bowl A and the cover C the ear of corn is turned by the user so that the entire surface of the ear of corn is buttered in a comparatively short time.

The corn butterer shown and described is very simple in construction and can be readily cleaned.

It will also be noticed that by the arrangement described the butter is not wasted, and any butter remaining in the bowl can be readily utilized as it is not soiled.

Having thus described my invention, I claim as new and desire to secure by Letters Patent:

1. A corn butterer, comprising a handled bowl adapted to contain butter, and a perforate cover for closing the said bowl, the said cover having a concave face adapted to fit onto the peripheral face of an ear of corn.

2. A corn butterer, comprising an elongated bowl having a concave rim, a handle extending from one end of the bowl, a perforate cover hinged on the said rim and conforming to the shape of the said rim to fit onto the peripheral face of an ear of corn, and a fastening device for fastening the free end of the cover to the said rim.

In testimony whereof I have signed my name to this specification in the presence of two subscribing witnesses.

HERBERT M. PRATT.

Witnesses:
　THEO. G. HOSTER,
　PHILIP D. ROLLHAUS.